(12) United States Patent
Yi et al.

(10) Patent No.: US 7,719,998 B2
(45) Date of Patent: *May 18, 2010

(54) METHOD FOR CONTROLLING RETRANSMISSION OF INFORMATION USING STATE VARIABLES IN RADIO COMMUNICATION SYSTEM

(75) Inventors: Seung June Yi, Seoul (KR); Woon Young Yeo, Kunpo (KR)

(73) Assignee: LG Electronics, Inc., Seoul (KR)

( * ) Notice: Subject to any disclaimer, the term of this patent is extended or adjusted under 35 U.S.C. 154(b) by 146 days.

This patent is subject to a terminal disclaimer.

(21) Appl. No.: 11/760,644

(22) Filed: Jun. 8, 2007

(65) Prior Publication Data

US 2007/0230384 A1 Oct. 4, 2007

Related U.S. Application Data

(63) Continuation of application No. 10/190,912, filed on Jul. 8, 2002, now Pat. No. 7,242,670.

(30) Foreign Application Priority Data

Jul. 7, 2001 (KR) ................................ 2001-40711
Aug. 27, 2001 (KR) ................................ 2001-51865

(51) Int. Cl.
*G01R 31/08* (2006.01)
(52) U.S. Cl. ....................... 370/252; 370/328
(58) Field of Classification Search ................ 370/229, 370/235, 236, 328, 338, 349, 394, 469, 252
See application file for complete search history.

(56) References Cited

U.S. PATENT DOCUMENTS

| 6,161,207 | A  | * | 12/2000 | Lockhart et al. | ............ 714/758 |
| 6,519,223 | B1 | * | 2/2003 | Wager et al. | ................ 370/216 |
| 6,798,842 | B2 | * | 9/2004 | Jiang | .......................... 375/295 |
| 2002/0054578 | A1 | * | 5/2002 | Zhang et al. | ................ 370/328 |
| 2002/0196760 | A1 | * | 12/2002 | Malomsoky et al. | ........ 370/338 |
| 2003/0002532 | A1 | * | 1/2003 | Huo | .......................... 370/474 |
| 2004/0013105 | A1 | * | 1/2004 | Ahmavaara et al. | ......... 370/349 |

FOREIGN PATENT DOCUMENTS

| KR | 10-2000-0026465 | 5/2000 |
| KR | 10-2001-0059727 | 7/2001 |

* cited by examiner

*Primary Examiner*—Brian D Nguyen
(74) *Attorney, Agent, or Firm*—Lee, Hong, Degerman, Kang & Waimey

(57) ABSTRACT

A method for re-transmitting data or control information in a radio link control layer relates to determining whether re-transmission will be ended by comparing a number of transmission with a critical value when the transmission of data or control information has successively failed. The retransmission cycle is comprised of the steps in the order of transmitting information, checking the transmission failure with exit, and counting the transmission number with exit. Therefore, the present invention makes any transmission be checked and prevents wasting radio resource which can occur in re-transmitting data or control information in UMTS mobile communication system.

25 Claims, 12 Drawing Sheets

METHOD FOR CONTROLLING RETRANSMISSION OF INFORMATION USING STATE VARIABLES IN RADIO COMMUNICATION SYSTEM

CROSS REFERENCE TO RELATED APPLICATIONS

This application is a continuation of U.S. application Ser. No. 10/190,912, filed Jul. 8, 2002, now U.S. Pat. No. 7,242,670, which pursuant to 35 U.S.C. §119 (a), claims the benefit of Korean Patent Application Nos. 2001-40711, filed on Jul. 7, 2001, and 2001-51865, filed on Aug. 27, 2001, which are hereby incorporated by reference in their entirety.

BACKGROUND OF THE INVENTION

1. Field of the Invention

The present invention relates to a method for re-transmitting data or control information in the radio link control layer of an IMT-2000 radio communication system and particularly, to a method for re-transmitting data or control information in the radio link control layer, capable of preventing waste of radio resource and errors by checking failure of the last transmission and performing the next process, when the number of the transmission of data or control information reaches a critical value by continuous transmission failure of data or control information between the radio link control layers of sender and receiver.

2. Description of the Related Art

A Third Generation Partnership Project (hereinafter, referred to as 3GPP) was formed by national or international or regional standardization organizations, such as ETSI of Europe, ARIB/TTC of Japan, T1 of USA, CWTS of China, and TTA of Korea in order to make a detailed specification of a European type third generation mobile communication system (IMT-2000 system). This system is called as UMTS (Universal Mobile Telecommunications System). UMTS adopted WCDMA (Wideband Code Divisional Multiple Access) technology as a radio access network technology. UMTS is being developed based on the General Packet Radio Service (GPRS) making its root on a packet-switched network and further based on the Global System for Mobile Communications (GSM) making its root on a circuit-switched network. In addition, the third generation mobile communication systems which are able to provide multimedia services, such as voice, video, and data, are under development in the above partnership.

The International Telecommunication Union (ITU) which is a subsidiary organization of the United Nations (UN) has the authority to establish the standards of international telecommunication. The 3GPP intends the international standards and suggests its own IMT-2000 standards to the ITU, which is different from the other organization 3GPP2. Conventionally, the radio access technology of the standards is called as W-CDMA and IMT-2000 technology standard, and also includes Universal Mobile Telecommunications System (UMTS).

The 3GPP includes five technical specification groups (hereinafter, referred to as TSG) in order to operate the project and to develop the technology rapidly and effectively. And the respective TSG takes a charge of development, approval, and management of a reference specification of related area. Among those groups, a radio access network (hereinafter, referred to as RAN) group develops a function, requirements of a user equipment and UMTS terrestrial radio access network (hereinafter, referred to as UTRAN), and the specification for an interface under an object of defining a new radio access network in the third generation mobile communication system.

The TSG-RAN group includes a plenary group and four Working Groups. The first Working Group (WG1) develops specification of the physical layer (first layer), the second working group (WG2) defines functions of the data link layer (second layer) and network layer (third layer). Also, the third working group determines specifications of an interface among a base station in the UTRAN, Radio Network Controller (hereinafter, referred as RNC) and a core network and the fourth working group discuss required conditions about the radio link capacity and requirements for the radio resource management.

FIG. 1 shows a structure of a radio interface protocol according to the 3GPP radio access network.

The radio interface protocol between a user equipment and UTRAN is composed of a physical layer, data link layer and network layer in parallel. Vertically, it includes a control plane for transmitting a control signal and a user plane for transmitting data information.

Describing FIG. 1 in more detail, the control plane includes a Radio Resource Control Layer (hereinafter, referred to as RRC), Radio Link Control Layer (hereinafter, referred as RLC), Medium Access Control Layer (hereinafter, referred as MAC) and Physical Layer. The user plane includes a Packet Data Convergence Protocol (hereinafter, referred as PDCP), RLC layer, MAC layer and physical layer.

The physical layer provides information transmission service to the upper layer using various radio transmission technologies. It is connected with the MAC layer which located at the upper portion by a transport channel and through the channel, data are moved between the MAC layer and physical layer. The transport channel is divided into a dedicated transport channel and a common transport channel according to whether it is monopolistically used by a user equipment or can be shared and used by a number of user equipments.

The MAC layer provides a re-allotting service of MAC parameter for allotting and re-allotting radio resource. The MAC layer is connected with the RLC layer by the logical channel and various logical channels are provided according to the kind of transmitted information. Generally, in case of transmitting information of the control plane, a control channel is used and in case of transmitting information of the user plane, a traffic channel is used.

The RLC layer provides radio link setting and canceling service and performs segmentation and concatenation of a RLC Service Data Unit (hereinafter, referred as SDU) which came from the upper layer of the user plane.

The header information is added to the RLC SDU and transmitted to the MAC layer in the form of the Protocol Data Unit (hereinafter, referred as PDU).

The PDCP layer is located at the upper portion of the RLC layer to transmit data by converting the data transmitted through internet network protocol, such as IPv4 or IPv6 into data in the form which fits the RLC layer. Also, data can be efficiently transmitted through radio interface by reducing unnecessary control information which is used in a wire network. This function is called as Header Compression and for instance, it can be used for reducing the amount of header information for TCP/IP.

The RRC provides an information broadcast service for broadcasting information to every user equipment located in a predetermined area. Also, the RRC takes the charge of control plane signal processing for exchanging control signal in the third layer and has functions of setting of radio resource between the user equipment and UTRAN, maintaining and canceling of the same. Particularly, the RRC has functions of setting, maintaining and canceling of a radio bearer and allotting, repositioning or canceling of radio resource used for radio resource access. At this time, the wireless bearer means a service which is provided by the second layer in order to transmit data between the user equipment and UTRAN. Namely, setting a radio bearer means that characteristics of protocol layer and channel which are necessary for providing a predetermined service are defined and each concrete parameter and operation method are set.

Hereinafter, the RLC layer will be described in more detail.

The RLC layer performs segmentation and concatenation of the RLC SDU which comes from the upper layer and composes the RLC PDU by adding the RLC header to the RLC payload which is composed after the operations of segmentation and concatenation. Since the RLC PDU header can include serial number, the receiver can detect the RLC PDU which is damaged when it is transmitted by checking the serial number of the received RLC PDU and can ask the sender for re-transmitting of the corresponding PDU.

The process that the RLC SDU are converted into an RLC PDU by the functions of segmentation and concatenation is shown in FIG. 2. As shown in FIG. 2, an RLC PDU can include one or more RLC SDU and an RLC SDU can be divided into a number of RLC PDU.

The operation of RLC layer includes three types of modes according to the functions and they are transparent mode, unacknowledged mode and acknowledged mode.

First, in case of operating the transparent mode, no header information is added to the RLC SDU which came from the upper layer. Generally, in the transparent mode, the RLC SDU segmentation and concatenation are not used, but exceptionally, the operations of segmentation and concatenation can be applied to the transparent mode according to the setting of the radio bearer Second, in case operating the unacknowledged mode, re-transmission is not supported even if the transmission is failed. Therefore, even if the data are damaged or there occurs problems in transmitting the data and the related data are discarded. AS services which can use the unacknowledged mode, there are a cell broadcast service, voice over IP which uses the IP network and the like.

Finally, if the RLC layer operates in the acknowledged mode, re-transmission is supported in case of packet transmission failure. Namely, the sender RLC layer receives the state information with which success of transmission can be judged from the receiver and retransmits the RLC PDU which requires re-transmission.

The state information including the information of the lost PDU is loaded in the Status PDU and transmitted by the receiver. The Status PDU can be transmitted from the sender to the receiver, and at this time, the sender sends the MRW (Move Receiving Window) instruction.

When the RLC layer operates in the acknowledged mode, the RLC PDUs are stored in the RLC buffer in the order according to the serial information in the header. The stored RLC PDUs are delivered to the MAC layer as many as the MAC layer requires, and generally, transmission is performed according to the order of the serial number. Since the RLC PDU sent from the sender first time are transmitted in the order of the serial number, the receiver RLC layer can determine the lost RLC PDU by observing the serial numbers received.

For example, if the serial numbers of the received RLC PDU are #23, #24, #25, #32 and #34, the RLC PDUs having the serial numbers of #26 to #31 and #33 are presumed to be lost. The receiver checks the serial numbers of the received RLC PDU and transmits the status PDU including the information of positive acknowledgement or negative acknowledgement to the sender, thus to support the process of re-transmission of the sender.

Generally, the RLC layers of the sender and receiver, respectively, have a transmission window and receiving window. The transmission window means the extent of the RLC PDU that the sender can send at once, and the receiver can receive only the PDUs having serial numbers which are in the receiving window and the PDUs having serial number which deviate from the receiving window. Similarly, the receiver can receive only the PDUs having the serial numbers which are in the receiving window, and the PDUs having the serial numbers which deviate from the receiving window are discarded as soon as they are received.

The sender manages the state variables which are related to the re-transmission function of data. The state variables are, VT (DAT), VT (MRW) and VT (RST).

In the above, the VT is an abbreviation of "Variable for Transmission", the DAT is "Data", the MRW is "Move Receiving Window", and RST is "Reset".

Hereinafter, the state variable will be described with reference to accompanied drawings.

FIG. 3 is a flow chart showing the process for re-transmitting the data or control information of the RLC using the conventional state variable.

First, the state variable is set to 0. Then the state variable related to the corresponding information is increased by 1 after such information concerning the radio link control layer has been transmitted. If the value of the state variable is smaller than the critical value, by comparing the size of the state variable and the critical value which was already set, the information is transmitted again. At each time the information is transmitted, the state variable is increased by one. Finally, when the state variable becomes same as or larger than the critical value, the re-transmission process is terminated and the sending and receiving setting is converted to perform a new process (steps 31, 32, 33, 34 and 35).

FIG. 4 is a flow chart showing the RLC PDU re-transmission process particularly using the state variable VT (DAT).

The VT (DAT) indicates the number of transmission of a specific RLC PDU in the sender RLC layer. Whenever the RLC PDU is sent, the VT is incremented by 1. At this time, a state variable VT (DAT) exists for respective RLC PDU. If the above value becomes same as or larger than MaxDAT corresponding to the critical value to prevent the specific RLC PDU from being constantly re-transmitted, all the SDU related to the corresponding PDU are discarded and instruction of Move Receiving Window (hereinafter, referred as MRW) is performed. At this time, the MRW instruction is transmitted in the form of a super field which comprises the status PDU sent from the sender and the super field is called as a Move Receiving Window Super Field (steps 41, 42, 43, 44, 45 and 46).

FIG. 5 is a flow chart showing a process of re-transmitting the MRW instruction particularly using the state variable VT (MRW) in the processes for re-transmitting information in FIG. 3.

The MRW instruction is sent when there is needed to move the receiving window in case the VT (DAT) value is same as or larger than MaxDAT or for another reasons. At this time, The receiving window instruction must be set considering all of data which are affected by discard of the corresponding PDU. For example, in case a RLC SDU is composed of a number of RLC PDU and the VT (DAT) of the first PDU becomes same as the MaxDAT, if the first PDU is discarded, the corresponding SDU no longer have any value as data and accordingly, all of the RLC PDU including the corresponding SDU must be discarded. At this time, the MRW instruction must include information of all of the PDU which were discarded.

The VT (MRW) means the number that the MRW instruction is sent and the value is increased by one whenever the MRW instruction is sent. The sender drives Timer_MRW which is a corresponding timer after the MRW instruction is sent. If MRW_ACK which is a positive response information of the MRW instruction cannot be received until the timer is expired, the MRW instruction loading the same information is re-transmitted.

When the value of VT (MRW) becomes same as or larger than the MaxMRW which corresponds to the critical value, the RLC layer determines that the MRW instruction can no longer be performed and resets the operation of the RLC layer (steps 51, 52, 53. 54 and 55).

FIG. 6 is a flow chart showing the process of re-transmitting the RST of the RLC layer using the state variable VT (RST) in the processes for re-transmitting information in FIG. 3.

The reset instruction is performed by sending the RESET PDU to the receiver in case the VT (MRW) value is the same as or larger than the MaxMRW, or the operation of the RLC layer is reset by another reasons. The sender drives Timer_RST which is a related timer when the RESET PDU is transmitted. If the RESET ACK PDU, which is positive response information, is not received from the receiver until the timer is expired, an identical RESET PDU is re-transmitted.

The VT (RST) represents the number that the RST instruction is sent and the value is increased by one whenever the sender sends the RESET PDU. When the VT (RST) becomes the same as or larger than the MaxRST, the RLC layer determines that further restoration is impossible, notifies such condition to the upper layer and stops the operation (steps 61, 62, 63. 64 and 65).

The RLC layer obtains various information which is necessary for re-transmission of the RLC PDU and operation of the RLC layer without any help from the upper layers, thus to make a root to be independently operated.

In addition, the above described state variable VT (DAT), VT (MRW) and VT (RST) is increased by one whenever the corresponding information (respectively, RLC PDU, MRW instruction and RESET PDU) is transmitted as in FIGS. 3 to 6. When the value reaches the critical or threshold value (respectively, MaxDAT, MaxMRW, Max and RST), the corresponding process is terminated and additional operations are requested. At this time, problems of the re-transmission method according to the respective state variables will be described as follows.

First, the problems in the re-transmission method of the RLC PDU will be described. If the present value of VT (DAT) is MaxDAT-1 and negative response is received from the receiver, the sender re-transmits the corresponding PDU and increases the value of the VT (DAT) by 1.

At this time, since the value of the VT(DAT) became the same as the MaxDAT, the sender immediately discards the corresponding RLC PDU and RLC SDU and sends the MRW instruction. Since the MRW instruction includes information on discarding of the RLC PDU which was sent right before, the receiver must discard it even if the receiver received the corresponding RLC PDU successfully. Therefore, the PDU which was sent right before and information on discarding of the RLC PDU can be transmitted almost simultaneously and accordingly, in conclusion, the RLC PDU is unnecessarily transmitted and resource is wasted.

Second, the problems on the method for re-transmitting the MRW instruction will be described as follows. If the present value of the VT (MRW) is MaxMRW-1 and if the MRW_ACK is not received before the driven Timer_MRW is expired, the sender re-transmits an identical MRW instruction and the value of the VT (MRW) is increased by 1.

At this time, since the value of the VT (MRW) becomes the same as the MaxMRW, the process of moving the receiving window is immediately ended and the RESET PDU is sent to the receiver. Since the transmitted reset instruction nullifies the MRW instruction which was sent right before and synchronizes the RLC layer of the receiver, the MRW instruction can not display the effects even if it was successfully received at the receiver, and the RLC layer of the receiver performs the reset instruction. Therefore, in conclusion, the MRW instruction is unnecessarily transmitted and resource is wasted.

Third, the problems on the re-transmission method of the RLC reset instruction will be described as follows. If the present value of the VT (RST) is MaxRST-1 and the RESET ACK PDU is not received before the driven Timer_RST is expired, the sender re-transmits the RESET PDU and increases the value of the VT (RST) by 1.

At this time, the RLC layer immediately stops every operation since the value of the VT (RST) became the same as the MaxRST, and notifies to the upper layer that the reset process of the RLC layer has failed. In this case, since the RESET PDU, which was sent right before, cannot display the effects even if the receiver received it successfully, the corresponding RESET PDU is unnecessarily transmitted and resource is wasted.

As in the above cases, in the conventional method for re-transmitting data or control information, the data or control information may be unnecessarily transmitted. Also, if such re-transmission method is used, serious errors in operating the system can occur. For instance, when the values of the MaxDAT, MaxMRW and MaxRST (which are critical or threshold values of the respective state variables) are set as "1", the value of the VT (DAT) becomes "1" after initially transmitting a specific PDU and sender sends the MRW instruction on the PDU which was transmitted immediately. After initially sending the MRW instruction, the value of the VT (MRW) becomes "1", and accordingly, the RESET PDU is immediately transmitted. Also, the value of the VT (RST) becomes "1" right after the RESET PDU is transmitted and the sender notifies the upper layer that an error is occurred. Namely, in case the critical value of the state variable is set as "1", the system cannot be operated normally.

SUMMARY OF THE INVENTION

Therefore, to solve the above problems related to the method for re-transmitting the above data and control information, an object of the present invention is to provide a method for retransmitting information, such as packet data or control information, that obviates the above-described problems.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a re-transmission method for the data or control information of the RLC comprises, setting the state variable of an information unit as 0; transmitting said information unit to the receiver; confirming success of the transmission; increasing the state variable related to the corresponding information unit by 1; comparing the state variable with the critical value; changing the state of sending and receiving, if the state variable is not smaller than the critical value or repeating transmission of the information unit, if the state variable is smaller than the critical value.

For Example:

1. re-transmission of RLC PDU: when the value of the state variable VT (DAT) is same as or larger than MaxDAT, which is the critical value, the sender performs Move Receiving Window instruction without retransmission of RLC PDU.

2. re-transmission of MRW instruction: when the value of the state variable VT (MRW) is the same as or larger than MaxMRW, which is the critical value, the sender performs RLC reset instruction without retransmission of MRW instruction.

3. re-transmission of RLC Reset PDU: when the value of the state variable VT (RST) is same as or larger than MaxRST, which is the critical value, the sender reports the status to upper layer without retransmission of RLC Reset PDU. According to one embodiment of the present invention, a method for re-transmitting packet information in a radio link control layer of a radio communication system comprises assigning a predetermined value to a reference value; comparing a state variable with the reference value; transmitting a packet information from a transmitting device to a receiving device if the state variable is less than the reference value or changing the state of sending and receiving without transmitting a packet information from a transmitting device to a receiving device, if the state variable is not smaller than the reference value; incrementing the state variable by an incremental value if said packet information is transmitted again.

According to another aspect of the present invention, the radio communication system comprises communication between a mobile user equipment and a network apparatus. Also, the packet information used in such system preferably comprises at least one of user data or control data used in the radio link control layer. The packet information may comprise a Move Receiving Window (MRW) instruction or a reset instruction of the radio link control layer.

According to another aspect of the present invention, the state variable is associated with transmission of at least one of data, move receiving window instruction and reset instruction. Similarly, the reference value is associated with transmission of at least one of data, move receiving window instruction and reset instruction.

According to another embodiment of the present invention, a terminal equipment used in a radio communication system for re-transmitting packet information to a network system comprises a plurality of control layers, each layer capable of communicating with a corresponding layer of the network system; a radio link control layer of the plurality of control layers of the terminal equipment assigning a predetermined value to a reference value, comparing a state variable with the reference value; and the radio link control layer transmitting a packet information from a transmitting device to a receiving device if the state variable is less than the reference value, or changing the state of sending and receiving without transmitting a packet information from a transmitting device to a receiving device, if the state variable is not smaller than the reference value, incrementing the state variable by an incremental value if said packet information is transmitted again.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE PREFERRED EMBODIMENTS

Figure 1:
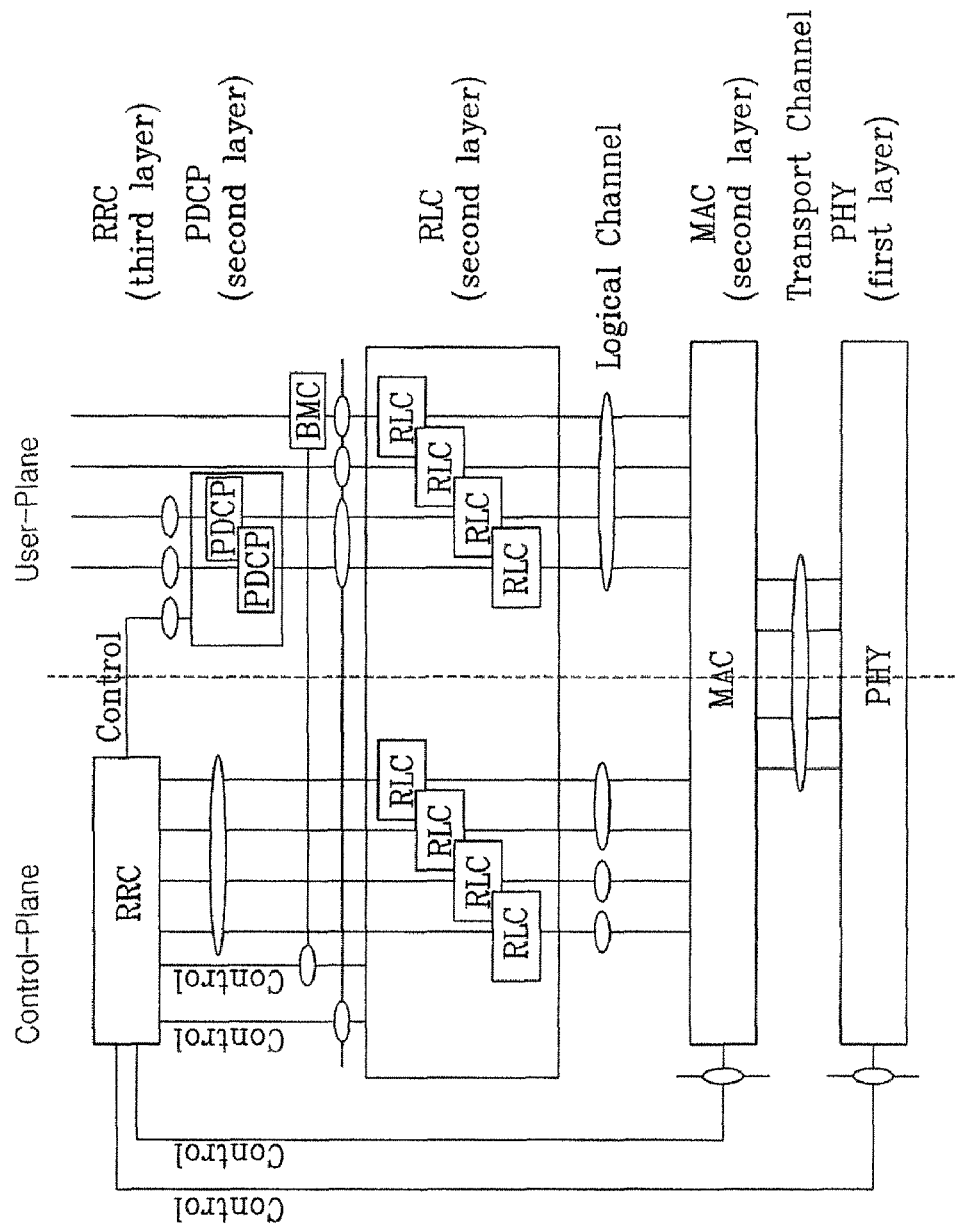
FIG. 1 shows a structure of a radio interface protocol according to the 3GPP radio access network.
Figure 2:
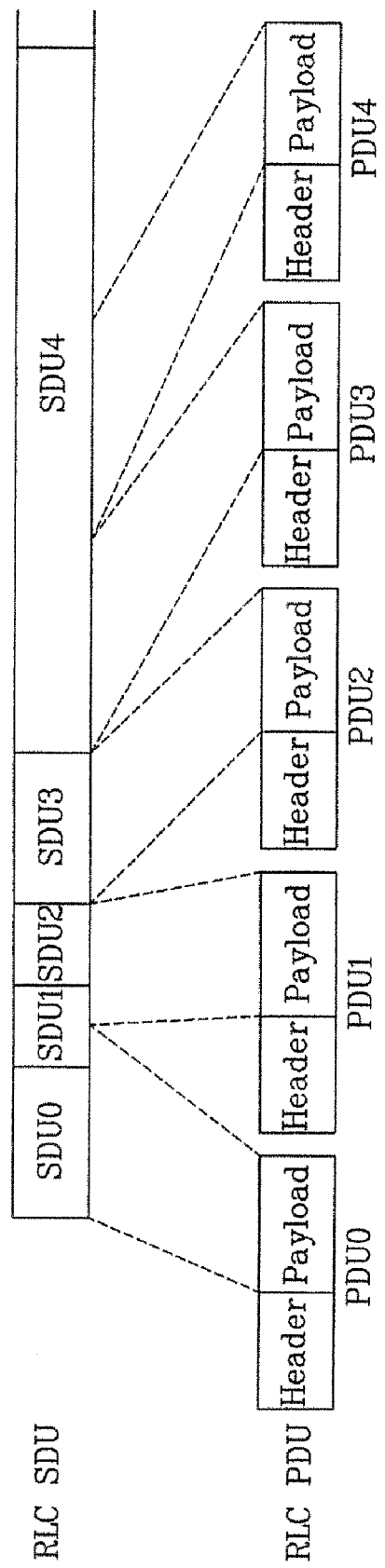
FIG. 2 is a view showing a process that the RLC SDU are converted into a RLC PDU by the functions of segmentation and concatenation.
Figure 3:
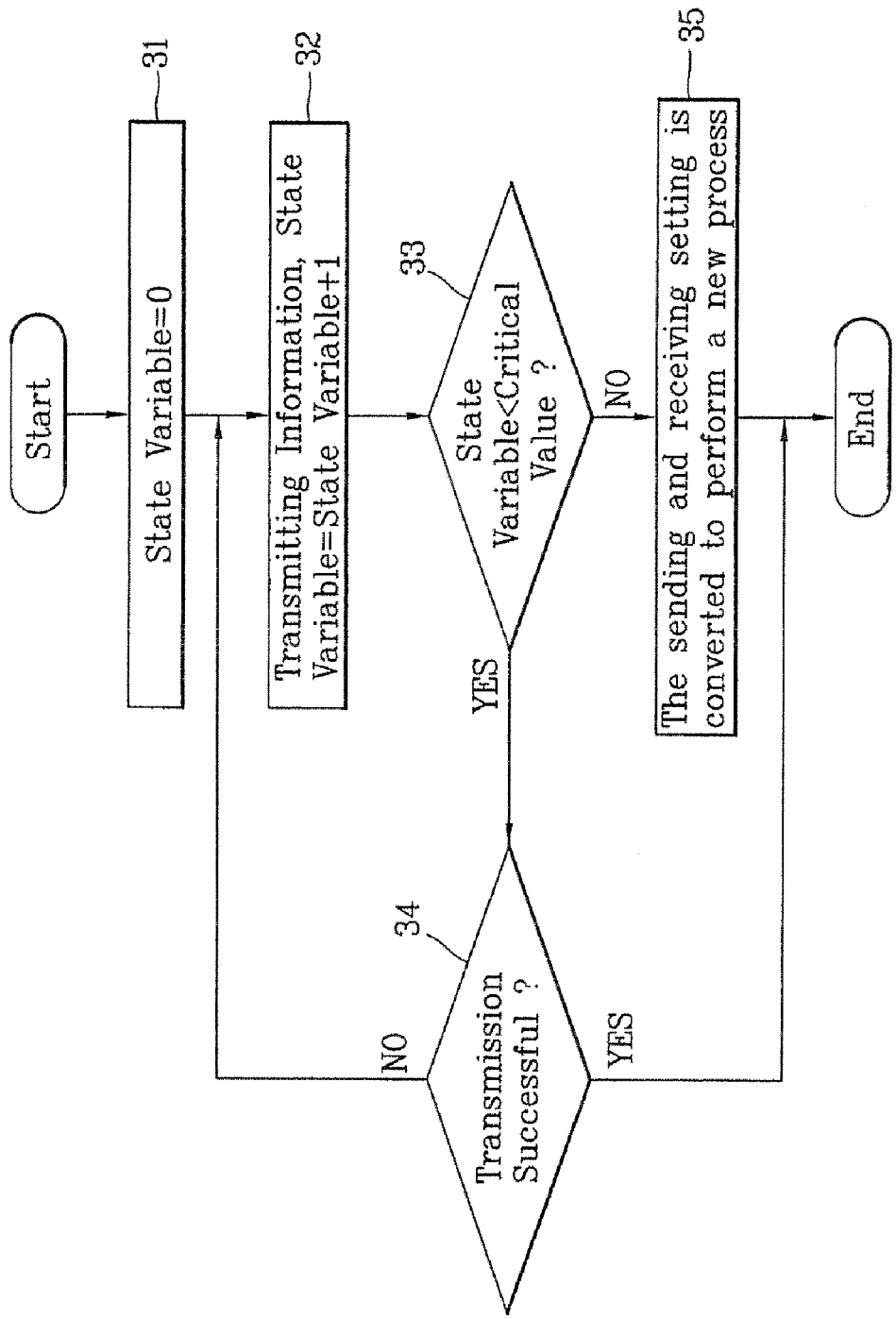
FIG. 3 is a flow chart showing the conventional process for re-transmitting the data or control information of the RLC using the state variable.
Figure 4:
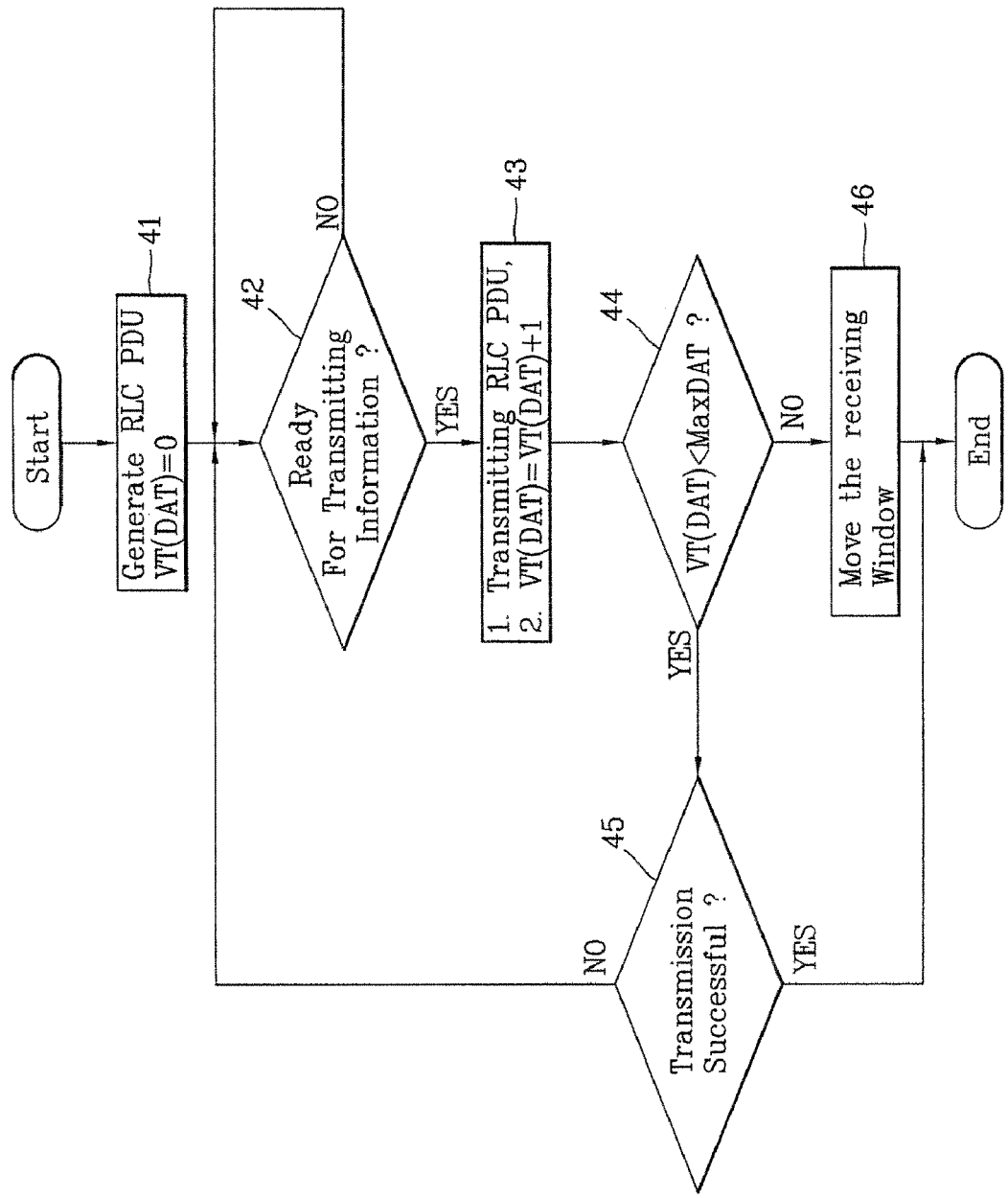
FIG. 4 is a flow chart showing the conventional re-transmission process of RLC PDU particularly using the state variable VT (DAT)
Figure 5:
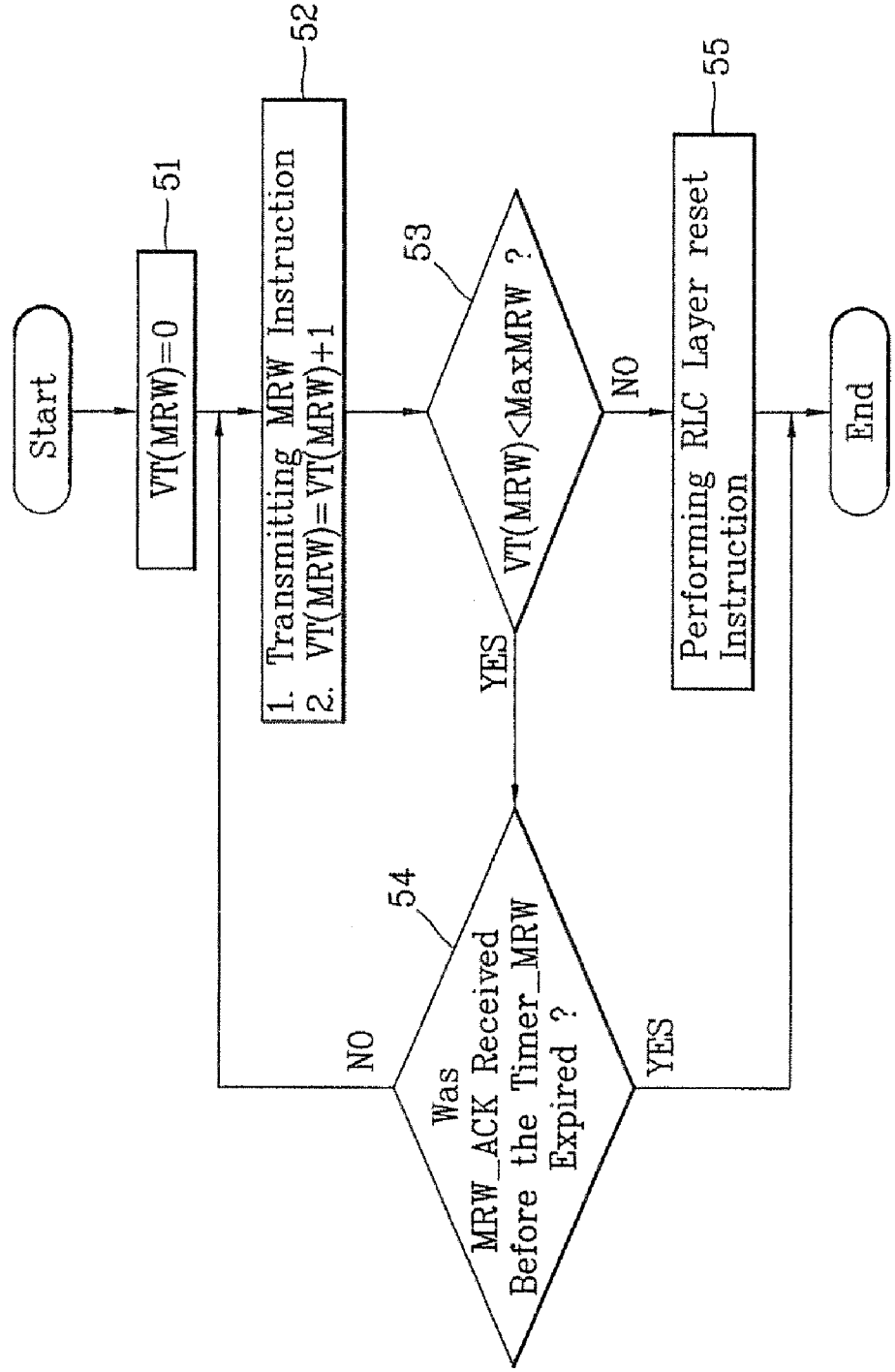
FIG. 5 is a flow chart showing the conventional process of re-transmitting the MRW instruction particularly using the state variable VT (MRW)
Figure 6:
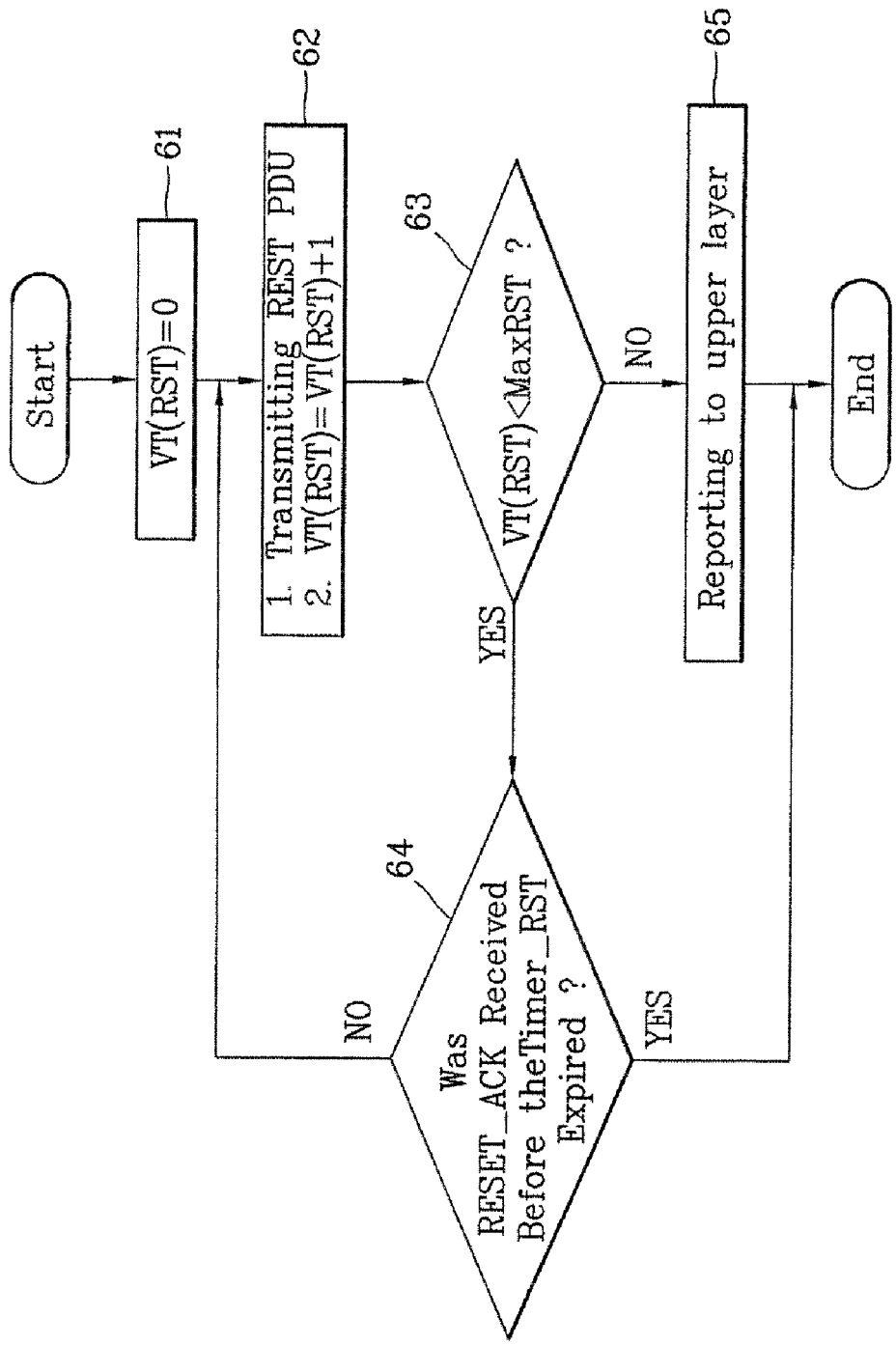
FIG. 6 is a flow chart showing the conventional process of re-transmitting the RST of the RLC layer using the conventional state variable VT (RST)

Reference will now be made in detail to the preferred embodiments of the present invention, examples of which are illustrated in the accompanying drawings.

According to a preferred embodiment of the present invention, the method for re-transmitting data or control information of a radio link control layer in the radio mobile communication system relates to a re-transmission process of information by repeating operations of transmission and checking as predetermined times in case a series of processes of transmitting information, such as data and control information, and receiving checking from the receiver, are failed continuously. When the number of transmission is the same as or larger than a predetermined number as sending of specific information has successively failed, the sender gives up re-transmission and performs the corresponding error processing process after confirming the last transmission of the information has failed.

Particularly, the present invention relates to a re-transmission process by comparing the number of transmission with the critical value (also known as threshold or reference value) when transmission of data or control information has successively failed. When the number of transmission is the same as or larger than a predetermined number (critical value) as the sending of specific data (RLC PDU) has successively failed, and the transmission of the data transmitted right before has turned out to have failed, the sender sends an MRW instruction to the receiver.

In addition, when the number of transmission of the MRW instruction is the same as or larger than MaxMRW, which is the critical or threshold value as sending of the MRW instruction (which is control information) has successively failed, and the MRW instruction which was sent right before has turned out to have failed, the sender sends a reset instruction for commanding reset of the radio link control layer to the receiver.

Also, when the number of transmission of the reset instruction is the same as or larger than the critical value (MaxRST) as sending of the reset instruction (which is control information) has successively failed and transmission of the reset instruction transmitted right before has turned out to have failed, the sender reports this to the upper layer.

Also, the processes are successively processed and accordingly, when the transmission of data or control information has successively failed, the number of transmission is re-transmitted by comparing it with the critical value. The method in accordance with the present invention, includes a step in which the sender sends an MRW instruction to the receiver, when the number of transmission is the same as or larger than a predetermined number as sending of the specific data (RLC PDU) has successively failed, and the transmission of the data transmitted right before has turned out to have failed; a step in which the sender sends a reset instruction for instructing reset of the radio link control layer to the receiver, when the number of transmission of the MRW instruction is the same as or larger than MaxMRW which is the critical value as sending of the MRW instruction which is control information is successively failed, and the MRW instruction which was sent right before is turned out to have failed; and a step in which the sender reports this to the upper layer, in case the number of transmission of the reset instruction is same as or larger than the critical value (MaxRST) as sending of the reset instruction which is control information is successively failed and transmission of the reset instruction transmitted right before is turned out to have failed.

The process of retransmission of data and control information by the suggested method is described.

Figure 7:
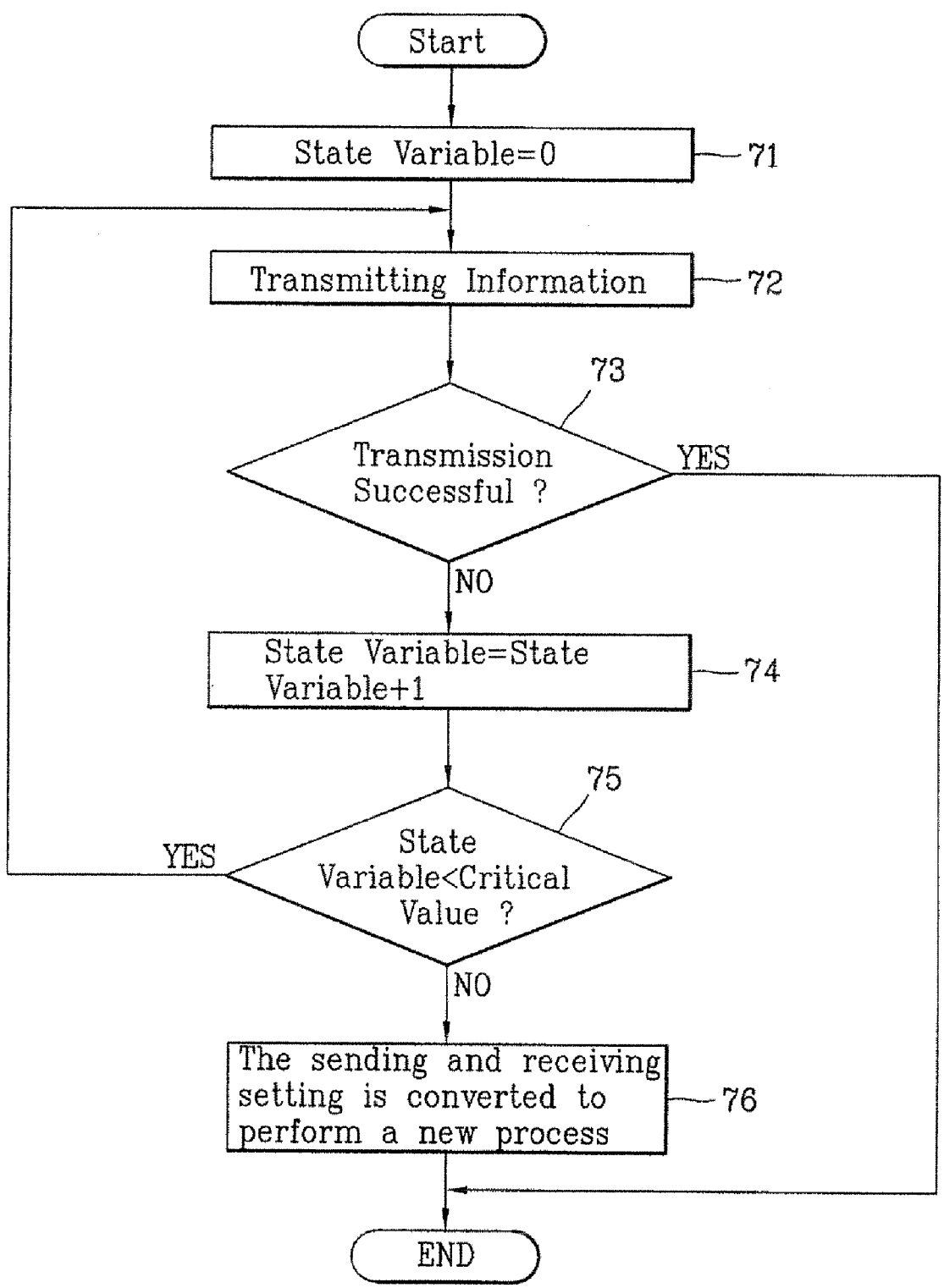
FIG. 7 is a flow chart illustrating a process for re-transmitting data or information among RLC layers, using the state variable in accordance with a preferred embodiment of the present invention.

FIG. 7 is a flow chart illustrating the general process for re-transmitting data or information between RLC layers of a sender and a receiver, preferably using the state variable.

In step 71, the state variable is set to 0. The information that needs to be transmitted is transmitted in step 72. In step 73, the transmission is confirmed by the receiver. If the RLC of the sender receives the confirmation from the receiver the re-transmission process is terminated. If the RLC of the sender does not receive the confirmation from the receiver, the state variable is increased by 1, as shown in step 74. In step 75, if the value of the state variable is smaller than the critical or threshold value by comparing the state variable with the critical value set in advance, the information is re-transmitted, as shown in step 72. Whenever the information is transmitted, the state variable is increased by 1. Finally, when the state variable becomes same as or larger than the critical value, the retransmission process is terminated, and the sending and receiving setting is converted to perform a new process.

In FIG. 7, the state variable is increased by 1 if the transmission was not successful after checking the transmission status. However, in an alternative embodiment, the step of checking of the transmission status and the step of increasing the state variable may be changed without deviating from the gist of the present invention. The order of the steps should be the cycle of transmitting information, checking the transmission failure with exit, and counting the transmission number with exit. If the exemplary embodiment sets the cycle as transmitting information, counting the transmission number with exit, and checking the transmission failure with exit, the exemplary embodiment could not check the failure of the transmission before the escape through the exit of transmission number counting.

Figure 8:
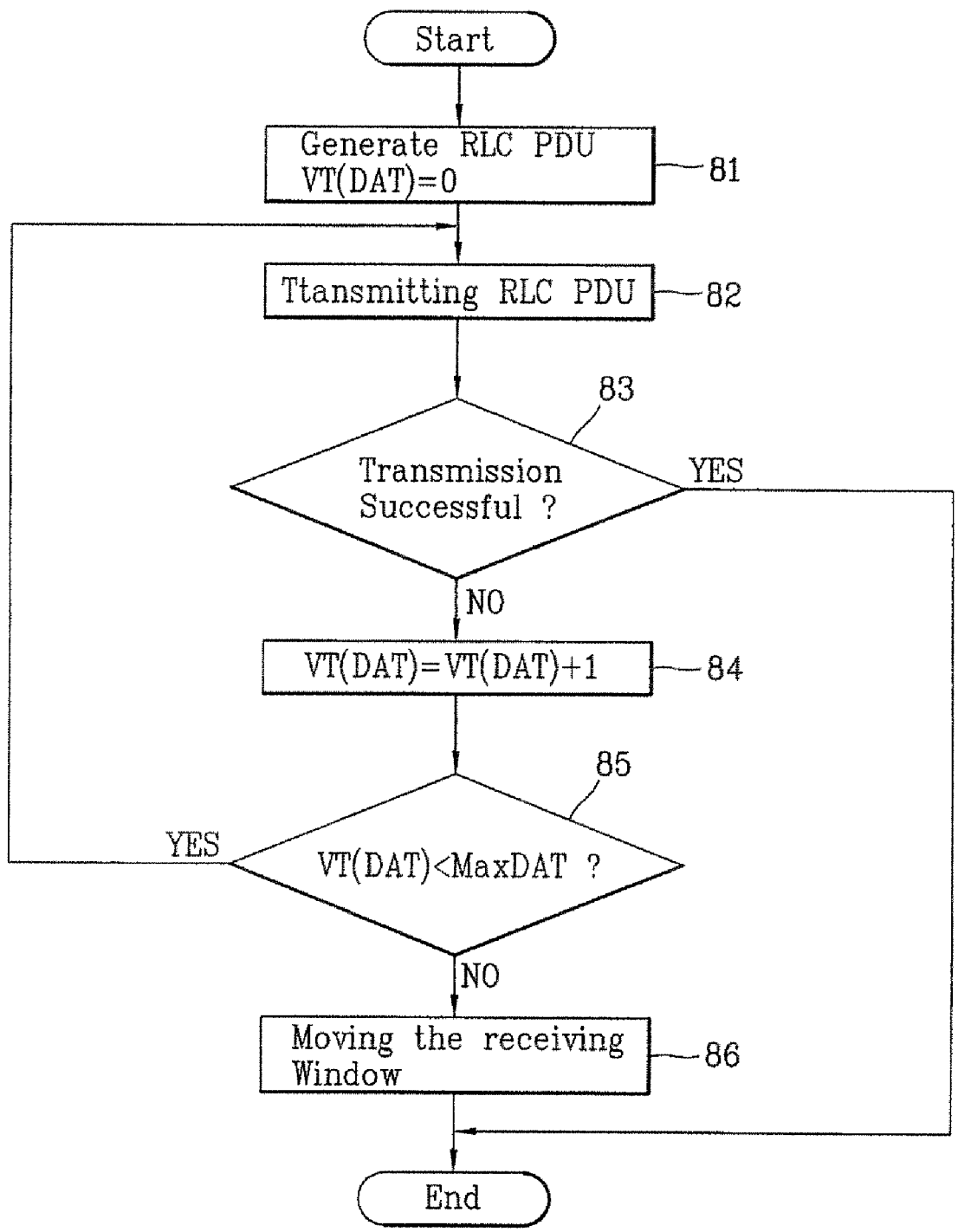
FIG. 8 is a flow chart illustrating the process of re-transmission of RLC PDU using the state variable VT (DAT) in accordance with the preferred embodiment of the present invention.

FIG. 8 is a flow chart illustrating the process of re-transmission of RLC PDU using the state variable VT (DAT) using the re-transmission process generally illustrated in FIG. 7.

As shown in the drawing, when the PDU is generated in the RLC layer, the value of the state variable VT (DAT) indicating the number of transmission of the corresponding PDU is set as 0 (step 81).

Then, the corresponding PDU is transmitted and whether the transmitted PDU is successfully received is checked in step 83. If the transmission is successful, the re-transmission process terminates. If the successful transmission cannot be verified or checked, the state variable VT (DAT) corresponding to the information is increased by 1 in step 84. The state variable is then compared with the critical value MaxDAT in step 85. When the value of the VT (DAT) is smaller than the critical value (MaxDAT), the corresponding PDU is re-transmitted, then the re-transmission is checked and the value of the VT (DAT) is increased by 1, if the successful transmission cannot be verified or checked. (steps 82, 83, 84 and 85).

When the value of the VT (DAT) is the same as or larger than the critical value MaxDAT, the sender stops the retransmission process of the corresponding PDU and performs the MRW instruction in step 86.

With the above method, the number of the RLC PDU transmitted until the value of the VT (DAT) becomes MaxDAT, is the same as in the conventional method. However, because the successful transmission of the PDU is checked prior to the checking of the state variable, the last RLC PDU transmitted is not wasted. In other words, the number of re-transmission is the same but whether the transmission of the last PDU was successful is first checked, thus preventing the last PDU from being transmitted unnecessarily. Also, even through the value of the MaxDAT is set to "1", the problem presented in conventional method no longer occurs.

Figure 9:
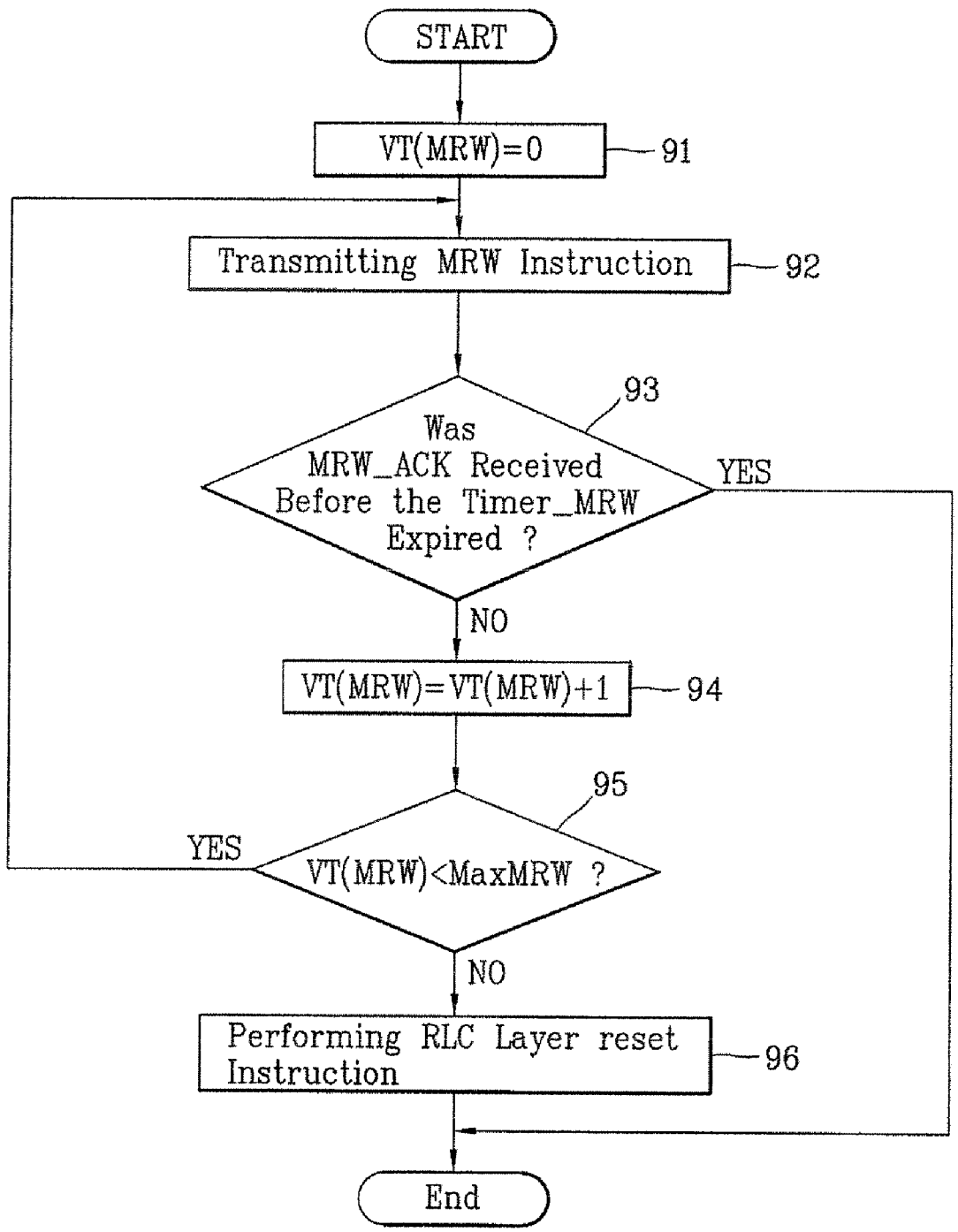
FIG. 9 is a flow chart illustrating the process of re-transmission of the MRW instruction using the state variable VT (MRW) in accordance with the preferred embodiment of the present invention.

FIG. 9 is a flow chart illustrating the process of re-transmission of the MRW instruction using the state variable VT (MRW) in the re-transmission process.

As shown in the drawing, the transmission process is terminated when a positive response about the corresponding MRW instruction until the Timer_MRW is expired after sending the MRW instruction, as successively shown in steps 91, 92 and 93. When the positive response about the corresponding MRW instruction is not received within a predetermined period, the value of the state variable VT (MRW) is increased by 1 in step 94, Then, the value is compared with the critical value MaxMRW in step 95. When the value of the VT (MRW)

is smaller than the critical value, the same MRW instruction is re-transmitted to the receiver in step 92. If the value of VT (MRW) becomes the same as or larger than the critical value, the error processing process, such as reset of the RLC layer, is performed in step 96.

According to the above method, the number of the MRW instructions which were transmitted to a receiver until the RESET PDU was transmitted as the value of the VT (MRW) reaches MaxMRW, is the same as in the conventional method. As a result, the last transmitted MRW instruction is not wasted. Also, even if the value of MaxMRW is set as "1," the processing error associated with conventional method as described above does not occur.

Figure 10:
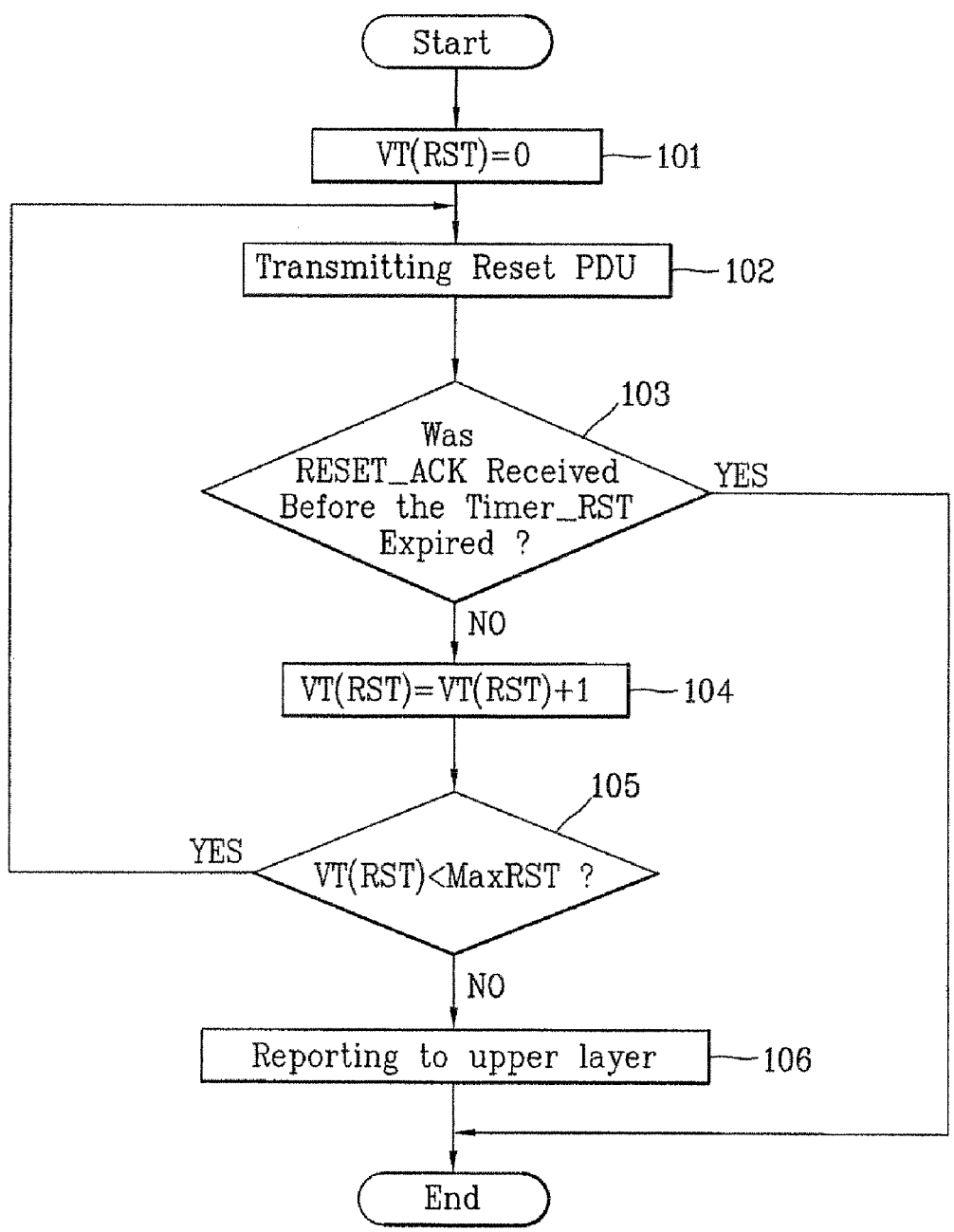
FIG. 10 is a flow chart illustrating the process of re-transmission of the reset instruction of the RLC layer using the state variable VT (RST) in accordance with the preferred embodiment of the present invention.

FIG. 10 is a flow chart showing the re-transmission process of the reset instruction of the RLC layer using the state variable VT (RST).

As shown in the drawing, when a positive response about the corresponding RESET PDU is received until the Timer_RST is expired after sending the RESET PDU, the process of re-transmission is terminated (steps 101, 102, 103). When the positive response about the corresponding RESET PDU is not received, the value of the VT (RST) is increased by 1 in step 104. The value is then compared with the critical value (MaxRST) in step 105. When the value of the VT (RST) is smaller than the critical value, the same RESET PDU is re-transmitted to the receiver in step 102. If the value of VT (RST) becomes the same as or larger than the critical value, this is reported to the upper layer in step 106.

By the above method, the number of the RESET PDU transmitted until the VT (RST) becomes MaxRST, is the same as in the conventional method. However, the final RESET PDU transmitted to a receiver is not wasted. Also, even if the value of the MaxRST is set as "1", the error associated with the conventional method does not occur.

Figure 11:
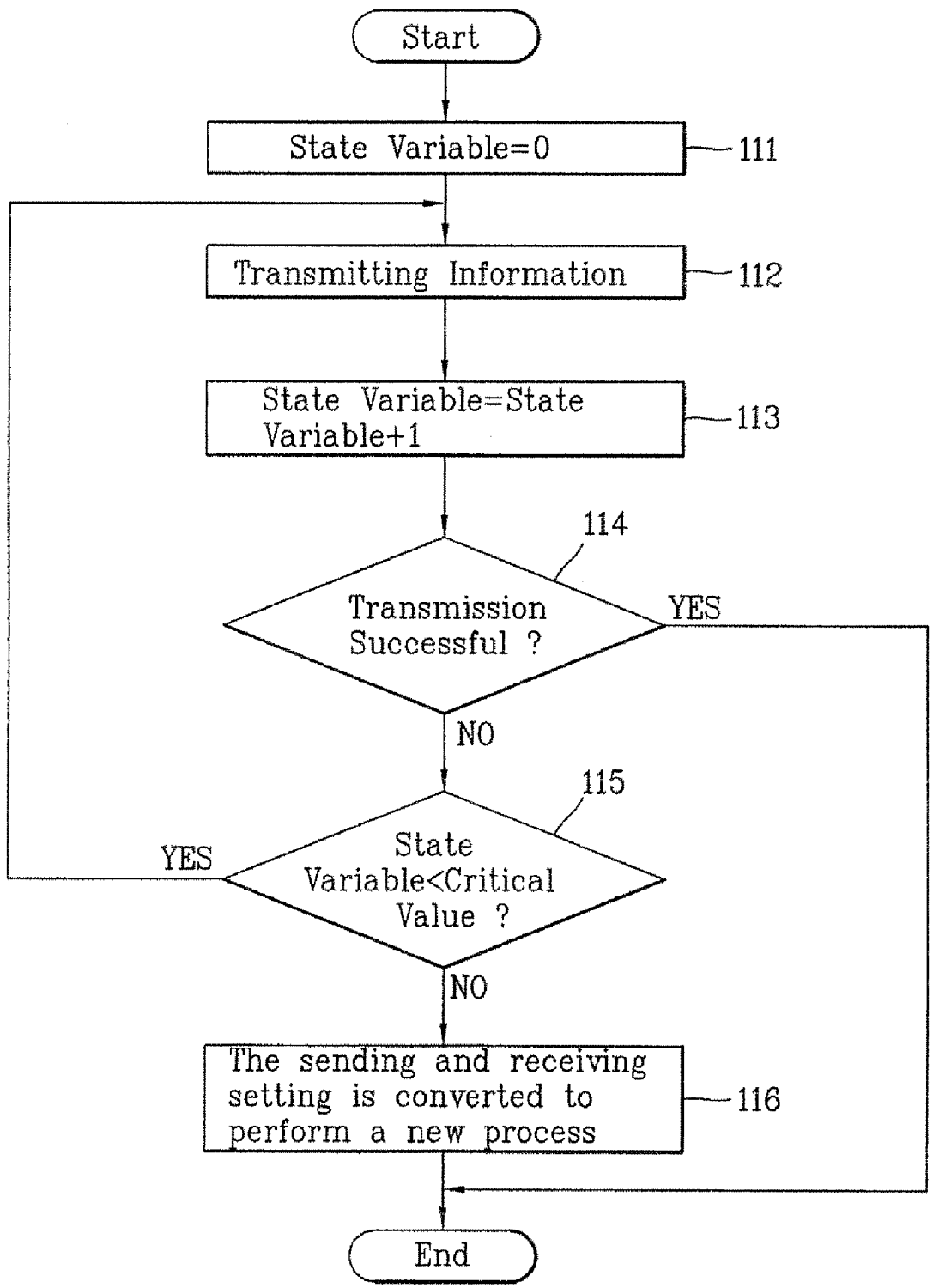
FIG. 11 is a flow chart illustrating another embodiment of the process of re-transmission of information among RLC layers using the state variable in accordance with the present invention.

FIG. 11 is a flow chart illustrating another embodiment of the process of re-transmission of information between RLC layers of a sender and a receiver using the state variables. In this embodiment, the step of increasing the state variable precedes the step of checking the transmission success in comparison with the steps depicted in FIG. 7. Although the state variable is increased before checking the transmission success, this does not increase the processing burden of either the network system or mobile equipment. When the transmission is successful and verified, this means that unnecessary calculation is performed only once more. So, processes of transmitting of information and changing the state variable may be performed successively or simultaneously.

Figure 12:
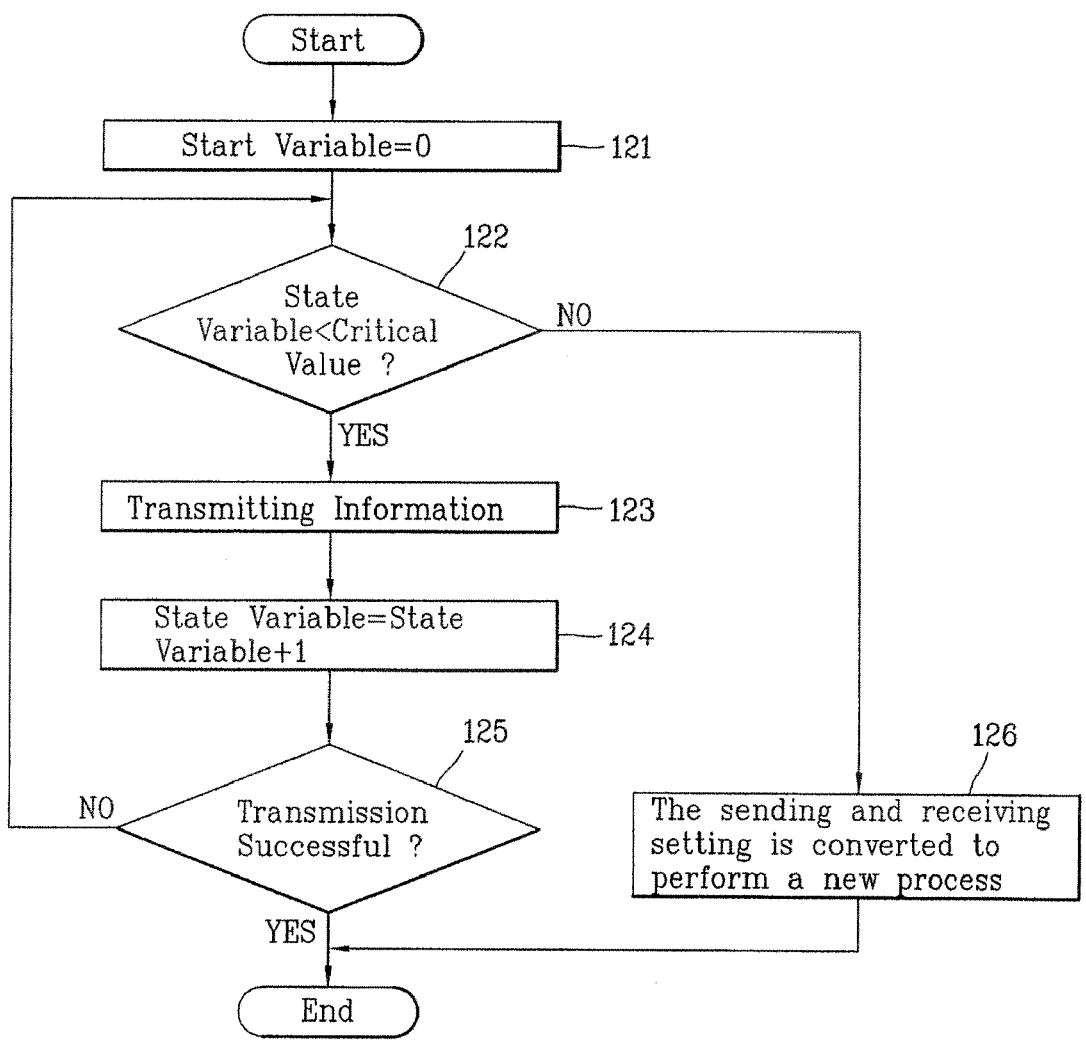
FIG. 12 is a flow chart illustrating still another embodiment of the process of re-transmission of information among RLC layers using the state variable in accordance with the present invention.

FIG. 12 is a flow chart illustrating yet another embodiment of the process of re-transmission of information between RLC layers of a sender and a receiver using the state variables.

The cycle of the main steps in FIGS. 7 and 11 is transmitting information, checking the transmission failure with exit, and counting the transmission number with exit. If processing steps are performed differently, then the preferred embodiment of the present invention cannot check the failure of the transmission before the escape through the exit of transmission number counting. FIG. 12 shows another flow maintaining the main cycle of the steps of present invention method.

In the embodiment illustrated in FIG. 12, the comparison between the state variable and the critical value is performed before the initial transmission of information. The number of transmission of information in the above process is the same as in the other embodiments. The method shown in FIGS. 11 and 12 may be applied in the re-transmission process of the RLC PDU or the MRW instruction, or in the process of retransmission of the reset instruction of the RLC layer.

Referring to FIG. 12, a state variable is initialized in step 121. The state variable is then compared with a critical value in step 122. If the state variable is less than the critical value, then the information, such as PDU or MRW or Reset, is transmitted to a receiving device in step 123. The state variable is then increased by an incremental value, such as one, in step 124. If the transmission is successful then the retransmission is not needed. Otherwise, the retransmission process as described above needs to be repeated. The determination of the successful transmission is determined, for example, by checking whether the successful receipt (or negative acknowledgment) has been acknowledged within a fixed time period using a timer. If the timer expires before the success acknowledgement is received, then the re-transmission process has to be repeated. If the state variable is the same or larger than the critical value, then the retransmission cycle is ended and the sending and receiving setting is converted to perform a new process as shown in step 126.

Using FIG. 12 and using one of state variable, namely, MRW as an example (the variables are used in FIG. 9 to describe one embodiment of the present invention), VT(MRW) is initialized in step 121. The VT(MRW) is then compared with a critical value in step 122. In this case, the critical value is MaxMRW. However, MaxMRW may be increased or decreased as system requirement dictates. If VT(MRW) is less than MaxMRW, then the MRW information is transmitted to a receiving device in step 123. VT(MRW) is then increased by an incremental value, such as one, in step 124. If the transmission is successful, then the retransmission is not needed. Otherwise, the retransmission process as described above needs to be repeated. The determination of the successful transmission is determined, for example, by checking whether MRW-ACK is received prior to the expiration of Timer_MRW (shown in FIG. 9). If successful, then the RLC starts transmission of RLC PDU under a new receiving window.

If VT(MRW) is the same or larger than, for example, MaxMRW, then RLC reset procedure is performed as shown in step 96.

In the above described inventions, the method for re-transmitting data or control information by the state variable has been described.

As described above, with the method for re-transmitting data or control information using the state variable in accordance with the present invention, unnecessary transmission of data or control information can be reduced and errors are eliminated which can occur in a system designed to transmit the respective information just once. As a result, an efficient and stable system is rendered.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting information of a radio link control (RLC) layer in a radio communication system, the method comprising:

transmitting, from a user equipment (UE) to a receiving device, data or control information of the RLC layer;

determining, at the UE, whether the transmission of the data or control information was unsuccessful;

only if the transmission was determined as being unsuccessful, comparing a number of transmissions of the data or control information with a value associated with a maximum number of transmissions;

only if the number of transmissions of the data or control information is less than the value associated with the maximum number of transmissions, repeating the transmitting, the determining, and the comparing operations; and if the number of transmissions of the data or control information is equal to the value associated with the maximum number of transmission, providing an indication to an upper layer.

2. The method of claim 1, wherein the transmission of the data or control information is determined as being unsuccessful if a response comprising a negatively acknowledge (NACK) signal is received at the UE from the receiving device.

3. The method of claim 1, further comprising receiving, at the UE, a response from the receiving device, the response comprising a status Protocol Data Unit (PDU).

4. The method of claim 1, wherein the data or control information relates to an Acknowledged mode data (AMD).

5. The method of claim 4, wherein the data or control information of the RLC layer comprises at least one of user data unit, a Move Receiving Window (MRW) command or a reset command.

6. The method of claim 5, wherein the user data unit is an Acknowledged Mode Data (AMD) Protocol Data Unit (PDU).

7. The method of claim 6, wherein the number of transmissions of the data or the control information is associated with transmission of a sequence number of the user data unit.

8. The method of claim 1, wherein the data or control information of the RLC layer is retransmitted only once.

9. The method of claim 1, further comprising terminating the method if the transmission was determined as being successful.

10. The method according to claim 1, wherein the upper layer is a protocol layer that is above the RLC layer.

11. The method according to claim 1, wherein the indication comprises a report relating to transmission failure of the data or control information.

12. A method for transmitting information of a radio link control (RLC) layer in a radio communication system, the method comprising:

comparing a number of transmissions of data or control information of the RLC layer with a value associated with a maximum number of transmissions;

only if the number of transmissions of the data or control information is less than the value associated with the maximum number of transmissions, transmitting, from a user equipment (UE) to a receiving device, the data or control information of the RLC layer and determining, at the UE, whether the transmission of the data or control information was unsuccessful;

only if the transmission was determined as being unsuccessful, repeating the comparing, the transmitting, and the determining operations; and if the number of transmissions of the data or control information is equal to the value associated with the maximum number of transmission, providing an indication to an upper layer.

13. The method of claim 12, further comprising:
initializing the number of transmissions of data or control information to a value of zero before comparing the number of transmissions of data or control information.

14. The method of claim 12, further comprising:
incrementing the number of transmissions of data or control information after transmitting the data or control information and before determining whether the transmission was unsuccessful.

15. The method of claim 12, further comprising: incrementing the number of transmissions of data or control information after comparing the number of transmissions of data or control information and before transmitting the data or control information.

16. The method of claim 12, further comprising:
only if the number of transmissions of the data or control information is equal to or greater than the value associated with the maximum number of transmissions, changing a setting for sending and receiving the data or control information of the RLC layer.

17. The method of claim 12, further comprising:
terminating the method upon determining that the transmission was successful or when the number of transmissions of the data or control information is equal to or greater than the value associated with the maximum number of transmissions.

18. The method of claim 12, wherein the data or control information of the RLC layer comprises at least one of a user data unit, a Move Receiving Window (MRW) command or a reset command.

19. The method of claim 12, wherein the number of transmissions of the data or control information is associated with transmission of at least one of a user data unit, a Move Receiving Window (MRW) command or a reset command.

20. The method of claim 12, wherein the value associated with the maximum number of transmissions is associated with transmission of at least one of a user data unit, a Move Receiving Window (MRW) command or a reset command.

21. The method according to claim 12, wherein the upper layer is a protocol layer that is above the RLC layer.

22. The method according to claim 12, wherein the indication comprises a report relating to transmission failure of the data or control information.

23. A user equipment (UE) for transmitting information in a radio communication system, the UE comprising:
a radio link control (RLC) layer; and
a processor configured to:
transmit data or control information of the RLC layer to a receiving device;
determine whether the transmission of the data or control information was unsuccessful;
compare, only if the transmission was determined as being unsuccessful, a number of transmissions of the data or control information with a value associated with a maximum number of transmissions;
repeat, only if the number of transmissions of the data or control information is less than the value associated with the maximum number of transmissions, the transmit, the determine, and the compare operations; and
if the number of transmission of the data or control information is equal to the value associated with the maximum number of transmission, provide an indication to an upper layer.

24. The UE according to claim 23, wherein the upper layer is a protocol layer that is above the RLC layer.

25. The UE according to claim 23, wherein the indication comprises a report relating to transmission failure of the data or control information.

* * * * *